United States Patent
Shenouda (10) Patent No.: US 11,499,883 B2
(45) Date of Patent: Nov. 15, 2022

(54) SYSTEM AND METHOD FOR MONITORING A PRESSURE TRANSDUCER

(71) Applicant: PRATT & WHITNEY CANADA CORP., Longueuil (CA)

(72) Inventor: Antwan Shenouda, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 339 days.

(21) Appl. No.: 16/654,236

(22) Filed: Oct. 16, 2019

(65) Prior Publication Data

US 2021/0116320 A1   Apr. 22, 2021

(51) Int. Cl.
  *G01M 15/14*   (2006.01)
  *G01L 19/06*   (2006.01)
  *G01L 27/00*   (2006.01)

(52) U.S. Cl.
  CPC .......... *G01L 19/06* (2013.01); *G01L 27/007* (2013.01); *G01M 15/14* (2013.01)

(58) Field of Classification Search
  CPC ....... G01L 19/06; G01L 27/007; G01M 15/14
  See application file for complete search history.

(56) References Cited

U.S. PATENT DOCUMENTS

| | | | |
|---|---|---|---|
| 7,900,616 B2 | 3/2011 | Saunders | |
| 8,631,688 B1* | 1/2014 | Rayl | G01M 15/09 |
| | | | 73/114.79 |
| 9,341,056 B2 | 5/2016 | Weightman et al. | |
| 10,132,192 B2 | 11/2018 | Scothern | |
| 10,161,341 B2 | 12/2018 | Taibi et al. | |
| 10,253,713 B2 | 4/2019 | Riepl | |
| 2005/0182555 A1* | 8/2005 | Yu | F02D 41/221 |
| | | | 701/107 |
| 2006/0277907 A1* | 12/2006 | Ueda | F02D 23/00 |
| | | | 60/601 |
| 2016/0341142 A1* | 11/2016 | Taibi | F01N 3/021 |
| 2021/0115808 A1* | 4/2021 | Shenouda | F01D 21/003 |

* cited by examiner

*Primary Examiner* — Eric S. McCall
(74) *Attorney, Agent, or Firm* — Norton Rose Fulbright Canada LLP (57) ABSTRACT

Systems and methods for monitoring a pressure transducer are described. The method comprises sampling an output signal of a pressure transducer to obtain a plurality of pressure measurements as recorded by the pressure transducer, comparing the pressure measurements to a first pressure exposure limit associated with the pressure transducer, and recording data related to exposure of the pressure transducer to the first pressure exposure limit.

16 Claims, 7 Drawing Sheets

SYSTEM AND METHOD FOR MONITORING A PRESSURE TRANSDUCER

TECHNICAL FIELD

The present disclosure relates generally to pressure transducers, and more particularly to monitoring of pressure transducers for exposure to excessive pressure.

BACKGROUND OF THE ART

Pressure transducer measurements of gas turbine engine parameters are used for many important and sometimes safety critical functions in aircraft, such as shaft torque measurement and burner pressure monitoring. Downtime experienced due to a malfunctioning pressure transducer can have an impact on the operation of the aircraft.

Pressure transducers are designed with various limits, sometimes called ratings. If pressure transducers are exposed to pressures beyond the limits, they are not guaranteed to function and may get damaged and/or start drifting. Therefore, improvements are needed.

SUMMARY

In accordance with a broad aspect, there is provided a method for monitoring a pressure transducer. The method comprises sampling an output signal of a pressure transducer to obtain a plurality of pressure measurements as recorded by the pressure transducer, comparing the pressure measurements to a first pressure exposure limit associated with the pressure transducer, and recording data related to exposure of the pressure transducer to the first pressure exposure limit.

In accordance with another broad aspect, there is provided a system for monitoring a pressure transducer. The system comprises a processing unit and a non-transitory computer readable medium having stored thereon program instructions. The program instructions are executable by the processing unit for sampling an output signal of a pressure transducer to obtain a plurality of pressure measurements as recorded by the pressure transducer, comparing the pressure measurements to a first pressure exposure limit associated with the pressure transducer, and recording data related to exposure of the pressure transducer to the first pressure exposure limit.

In accordance with yet another broad aspect, there is provided a system comprising a gas turbine engine, at least one pressure transducer coupled to the gas turbine engine for measuring pressure along a gas path thereof, and a controller coupled to the at least one pressure transducer. The controller is configured for sampling an output signal of the at least one pressure transducer to obtain a plurality of pressure measurements, comparing the pressure measurements to a first pressure exposure limit associated with the at least one pressure transducer, and recording data related to exposure of the at least one pressure transducer to the first pressure exposure limit.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
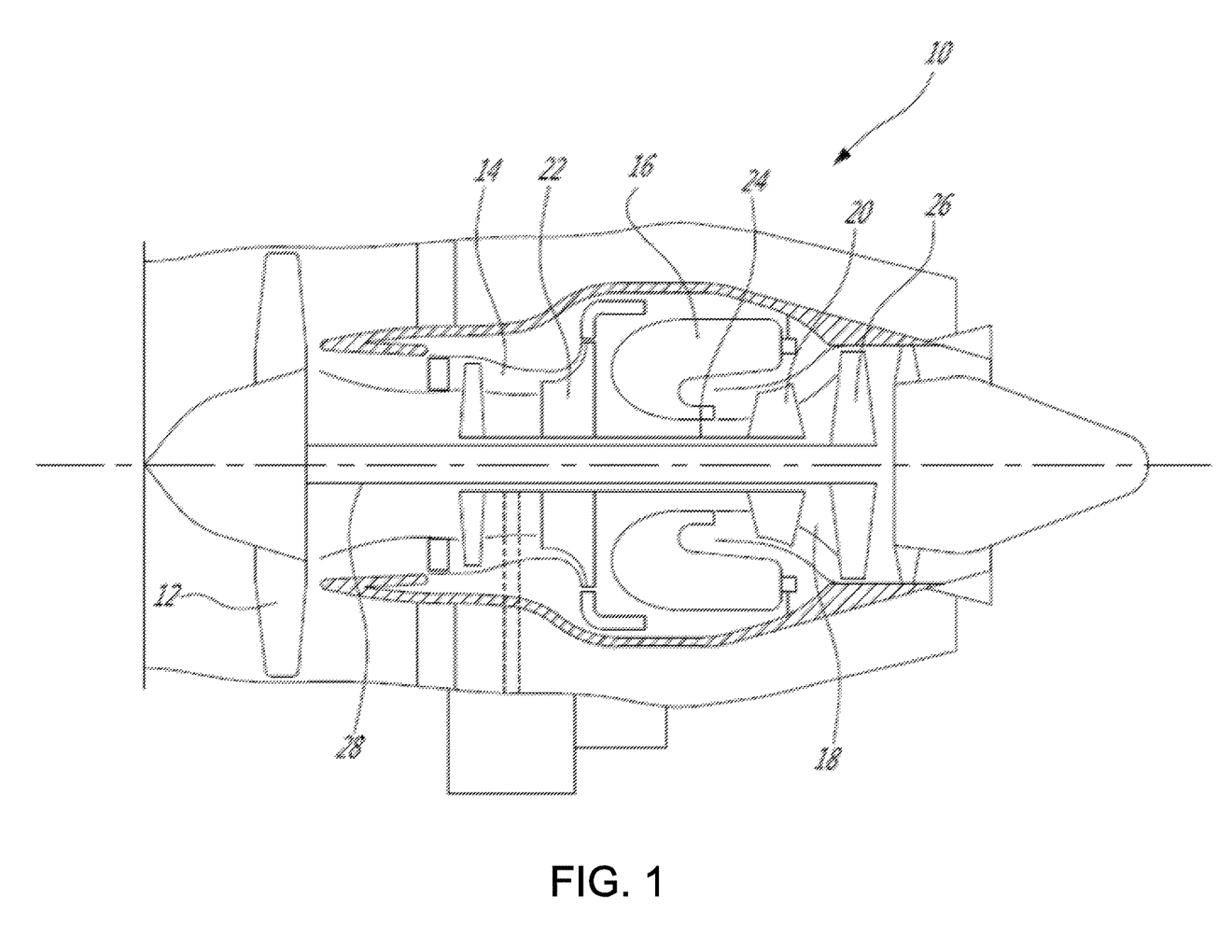
FIG. 1 is a schematic cross-sectional view of a gas turbine engine, in accordance with one or more embodiments.

FIG. 1 illustrates a gas turbine engine 10 of a type provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to low pressure rotor(s) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and an output shaft through which power is transferred. A turboprop engine may also apply. In addition, although the engine 10 is described herein for flight applications, it should be understood that other uses, such as industrial or the like, may apply.

As air passes through the engine 10, it undergoes numerous pressure and temperature changes along the way. The path along which air flows is referred to as the "gas path". There are numerous pressure measurement points for the airflow along the gas path. For example, pressure may be measured as air enters the engine 10 through the fan rotor 12, at an inlet of the compressor section 14, at an outlet of the compressor section 14, etc. Such measurements may be made with one or more pressure transducers.

Figure 2A:
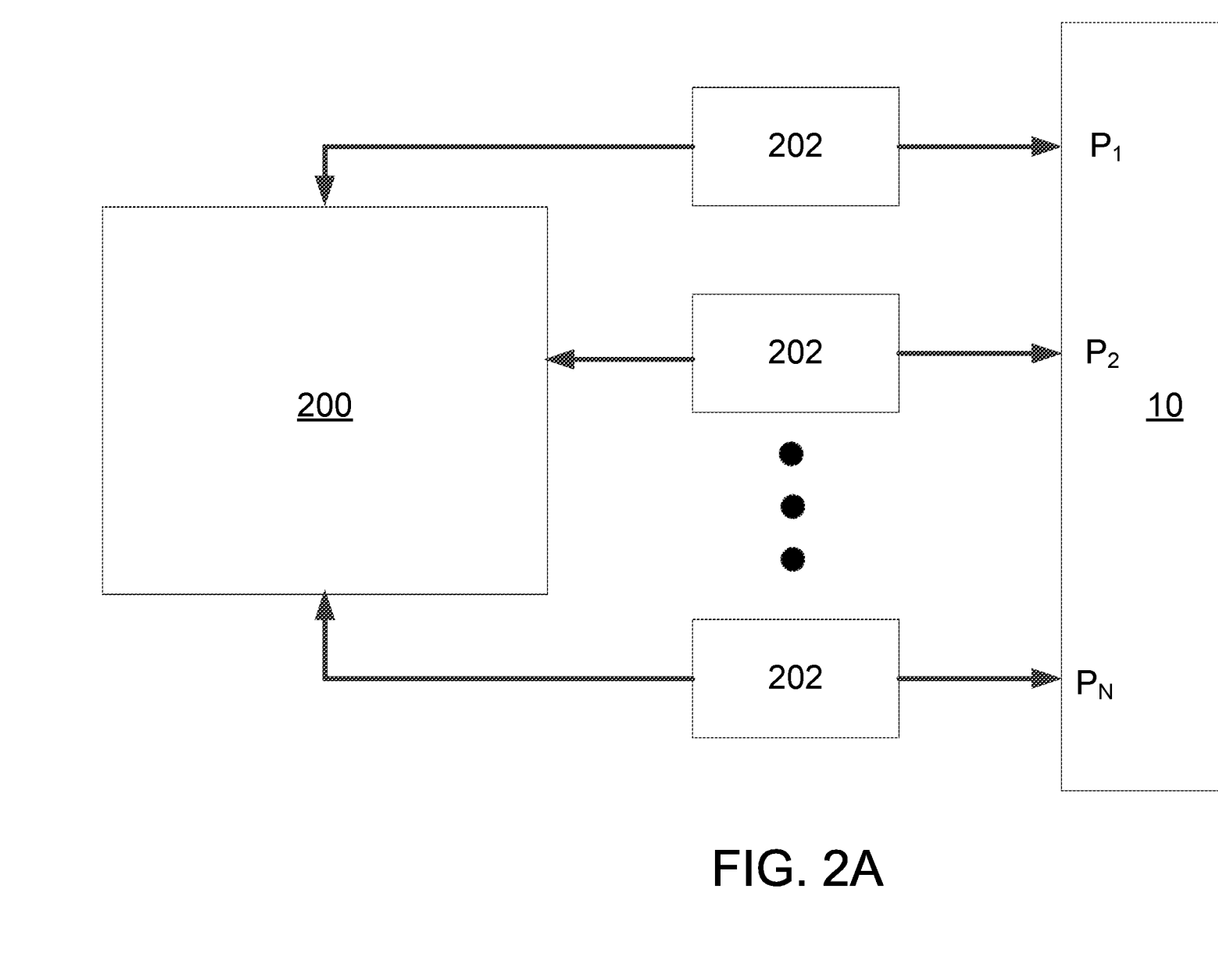
FIG. 2A is a block diagram of a system for monitoring pressure transducers, in accordance with one or more embodiments.

With reference to FIG. 2A, one or more pressure transducers 202 record pressure measurements at various positions of the engine 10, such as $P_1, P_2, \ldots P_N$. N may be any suitable integer corresponding to a number of pressure transducers 202 provided for monitoring pressure of the engine 10. A controller 200 is configured for obtaining and recording the pressure measurements from the pressure transducers 202.

The pressure transducer(s) 202 may be any pressure sensor for pressure measurement of a fluid (gas or liquid) capable of generating a signal as a function of the pressure imposed thereon. In some embodiments, the pressure transducer 202 is used to indirectly measure a variable other than pressure, such as fluid flow, water level, and altitude. The pressure transducer 202 may be of various types, such as an absolute pressure sensor, a gauge pressure sensor, a vacuum pressure sensor, a differential pressure sensor, and a sealed pressure sensor. The pressure transducer 202 may operate on the basis of a variety of technologies, such as but not limited to piezoelectric, capacitive, electromagnetic, strain-gauge, optical, piezoresistive, and potentiometric.

The pressure transducer 202 is designed with various pressure limits. The values within which the instrument is designed to measure, specified by its lower and upper limits, is referred to as the pressure range. To provide a margin of safety, the pressure transducer 202 may be selected such that the operating pressure of the engine 10 is a certain percentage of a maximum pressure rating of the pressure transducer 202, such as 50%, 60%, 75%, or any other suitable value. Proof pressure, which may also be referred to as an over-range capacity (for an absolute transducer) or differential overload (for a differential transducer), is the maximum specified pressure which may be applied to the sensing element of a pressure transducer (or maximum allowable difference in pressure between the two pressure ports for a differential transducer) without causing a permanent change in the output characteristics of the pressure transducer. The proof pressure can be expressed as a specific pressure limit or as a multiple of the upper range value of the pressure range. Burst pressure is the maximum fluid pressure that may be applied to the transducer's pressure cavity (or to the pressure ports, either simultaneously or separately, for a differential transducer) without causing leakage of the fluid being measured from the pressure cavity. In some cases, the burst pressure may pertain to the transducer body itself.

If the pressure transducer 202 is exposed to pressures beyond some of its design limits, such as proof pressure, it may get damaged and/or start drifting. The pressure transducer 202 may stop functioning if exposed to pressures beyond its burst pressure. In some embodiments, the controller 200 is configured to monitor the pressure transducer 202 to determine if the pressure transducer 202 is ever exposed to pressures that are in excess of its limits. Such monitoring may proactively detect pressure transducer failure and/or prevent an aircraft on ground (AOG) scenario and/or prevent unscheduled maintenance events. Monitoring of the pressure transducer 202 may also provide dynamic insight into sensor quality characteristics and long term health prediction of the pressure transducer 202. If the pressure transducer 202 is operated outside its limits, data obtained during the monitoring may be used to alert the engine manufacturer and/or aircraft operator of a potential impending transducer drift or failure, as applicable. The data may also be used as evidence by an engine manufacturer, for a warranty claim from the transducer manufacturer, if the transducer fails without the pressure exceeding its limits.

Figure 2B:
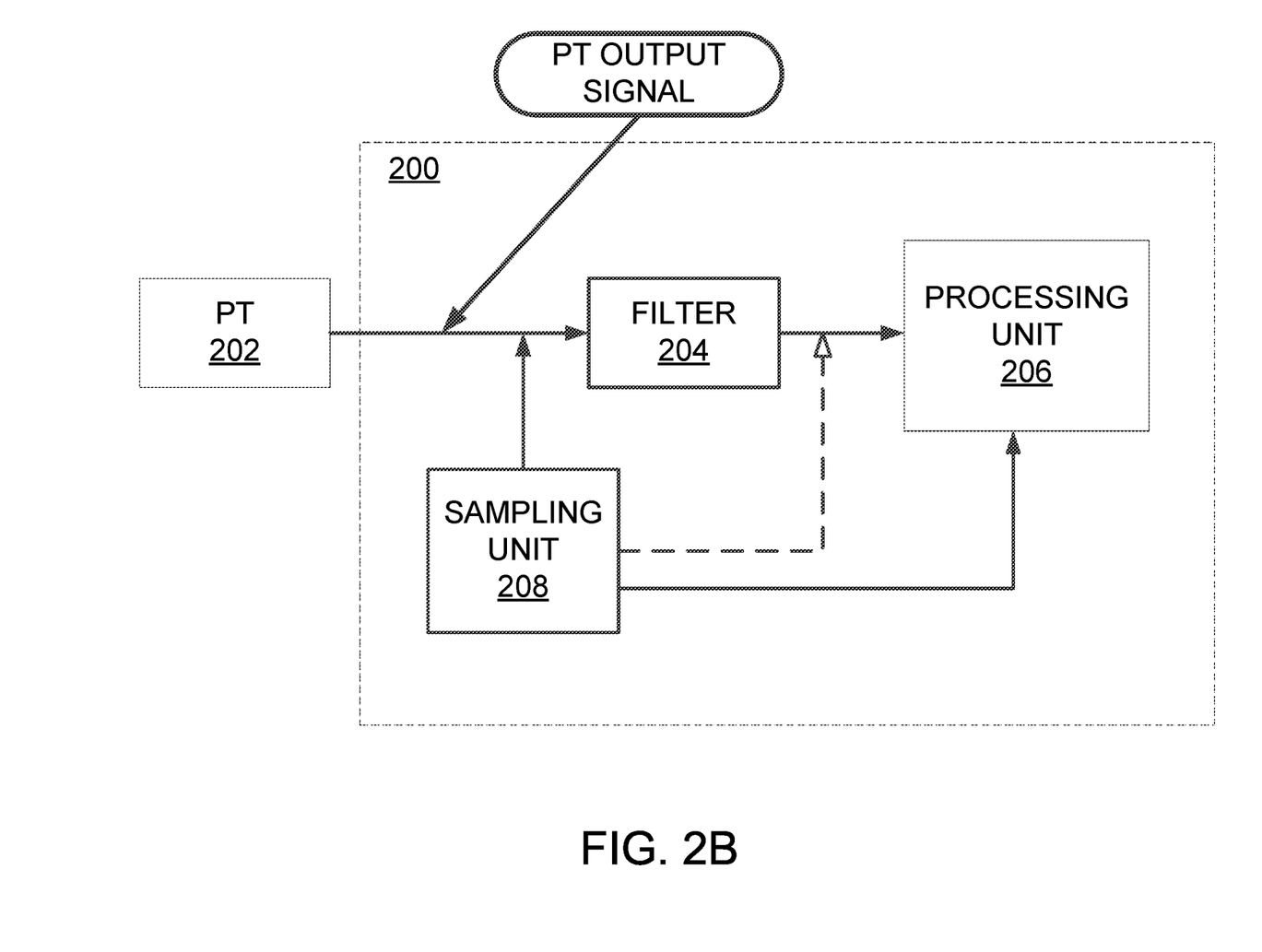
FIG. 2B is a block diagram of a controller, in accordance with one or more embodiments.

Monitoring of the pressure transducer 202 may be performed by the controller 200 or by another system, such as an engine or aircraft data acquisition system. FIG. 2B illustrates an example embodiment where the controller 200 is configured for monitoring the pressure transducer 200. A sampling unit 208 samples an output signal of the pressure transducer 202 to obtain a plurality of instantaneous pressure measurements as recorded by the pressure transducer 202. The pressure measurements are then compared to one or more pressure exposure limits for the pressure applied to the pressure transducer 202.

In some embodiments, the output signal is sampled prior to the output signal being filtered, for example by filter 204.

The filter 204 averages out the output signal, which in certain circumstances may filter out pressure ripples that comprise peak pressure values to which the pressure transducer 202 has been exposed. It will be understood that in certain embodiments, the sampling unit 208 may sample the output signal of the pressure transducer 202 after the filter 204. For example, if the output signal is a low frequency pressure pulse and the filter is a low-pass filter with a cut-off frequency above the highest ripple frequency, then the output signal may be sampled after the filter 204.

The sampling unit 208 may, in some embodiments, provide the samples of the output signal to a processing unit 206 for comparing to the one or more thresholds. Alternatively, the sampling unit 208 may itself compare the samples to the one or more thresholds. The outcome of the comparison may be provided to the processing unit 206 for further processing, to another device or system for further processing, or further processed by the sampling unit 208.

Figure 3A:
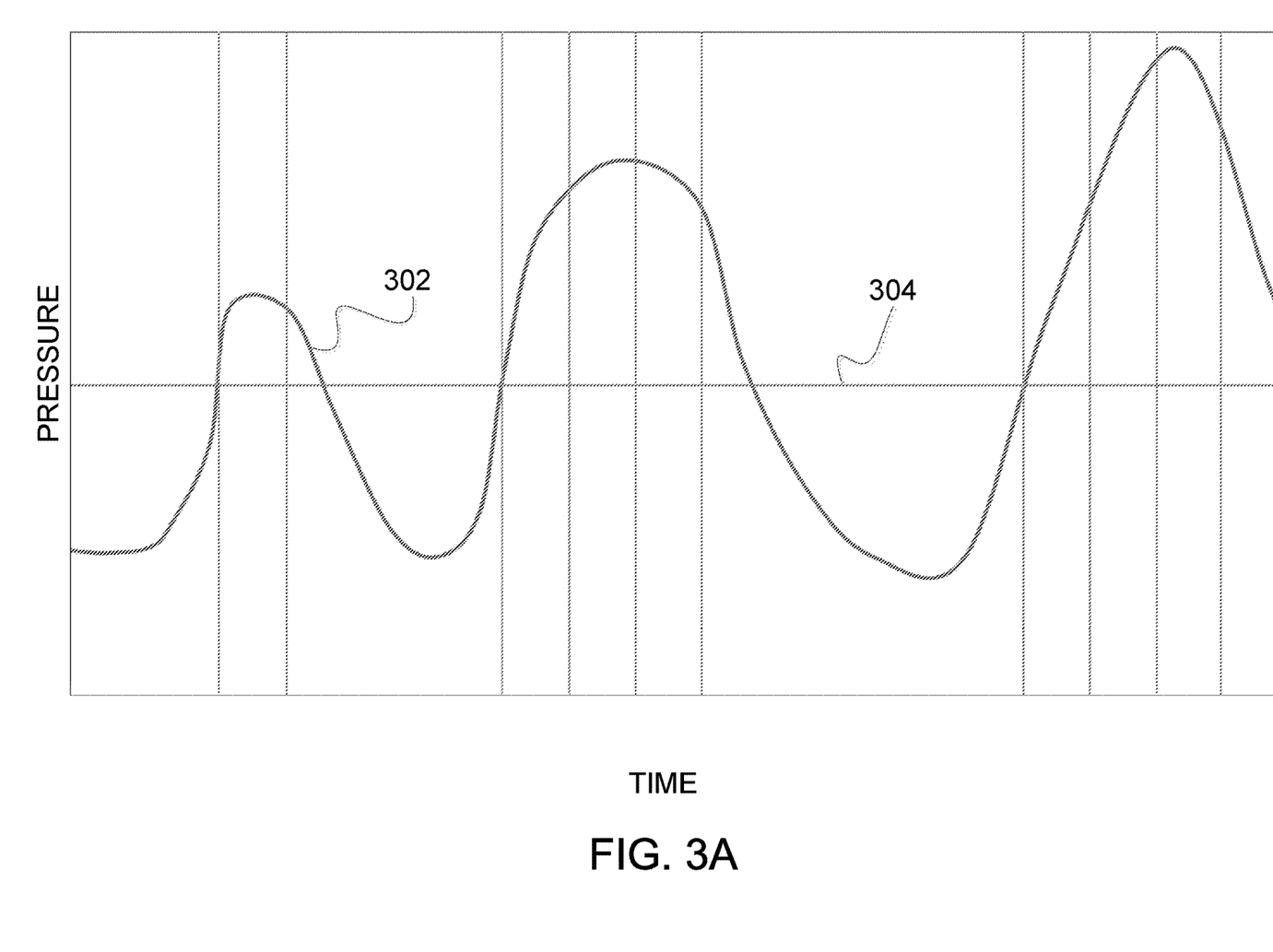
FIG. 3A is a graph illustrating instantaneous pressure measurements over time compared to a threshold, in accordance with one or more embodiments.

Referring to FIG. 3A, there is illustrated an example of a sampled output signal 302 over time. The sampled output signal 302 is compared to a threshold 304, i.e. a first pressure exposure limit. The threshold 304 is associated with an exposure limit for the pressure applied to the pressure transducer 202. For example, the threshold 304 may be a proof pressure or a burst pressure. In some embodiments, the threshold 304 is associated to the exposure limit in that it is a value that is lower than the exposure limit, such as the proof pressure or the burst pressure, by a given amount, such as 1%, 5%, 10% or any other suitable value. It may be desirable to monitor exposure of the pressure transducer 202 to pressures that are close to but not exactly equal to the rated limits. This may be suitable in the case where, for example, exposure to the exact rated limit results in an immediate failure of the pressure transducer, whereas exposure to values that are close to the limit but do not reach the limit has a compounded, but less critical, effect over time, such as drift or an eventual failure. In some embodiments, the application for which the pressure transducer 202 is used may determine the threshold used. For example, in a safety critical application, a more preventive approach may be used than in a routine application.

Figure 3B:
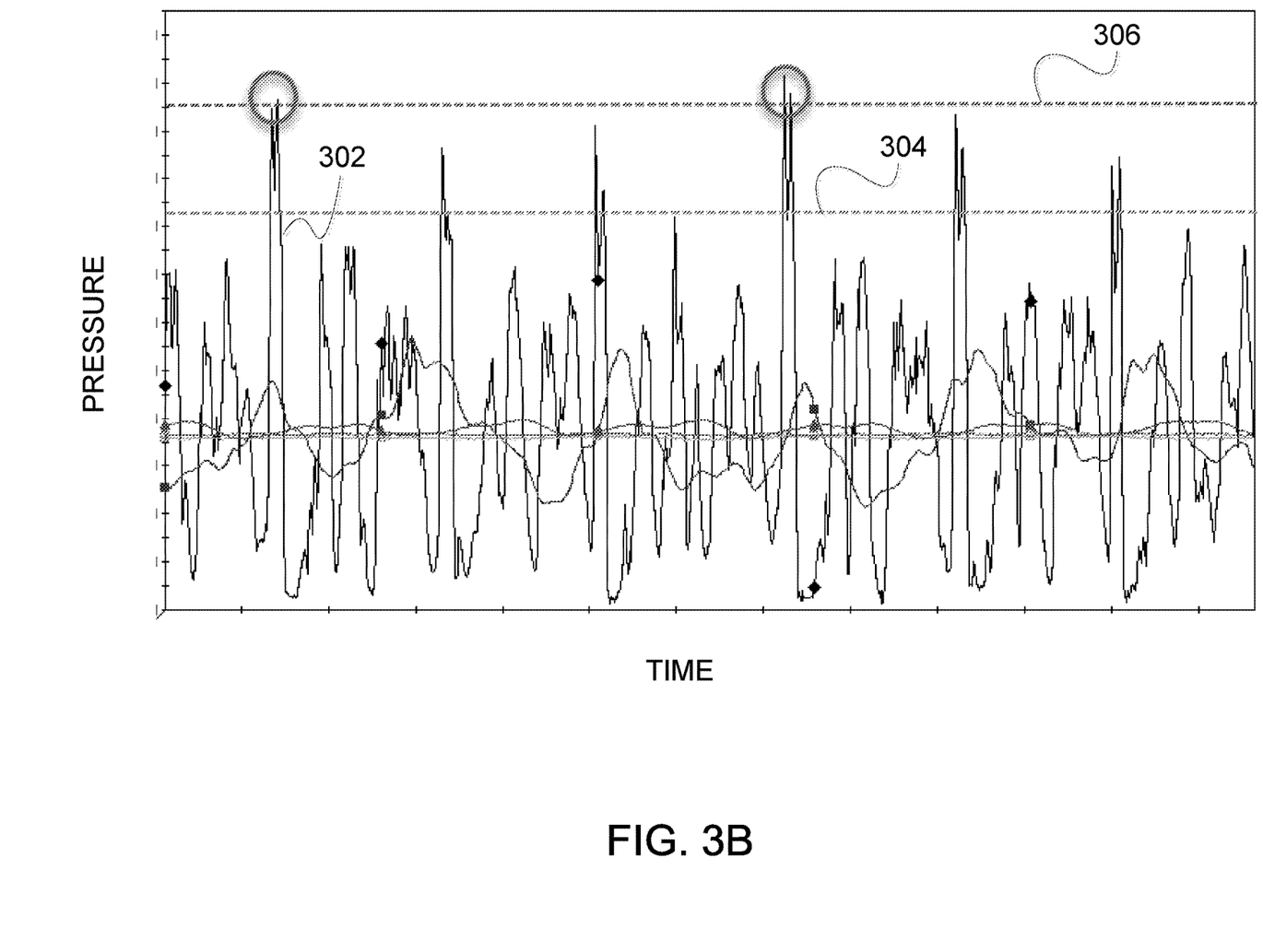
FIG. 3B is a graph illustrating instantaneous pressure measurements over time compared to two thresholds, in accordance with one or more embodiments.

In some embodiments, the sampled output signal 302 is compared to more than one threshold, as illustrated in the example of FIG. 3B. The sampled output signal 302 is compared to both the first threshold 304 and a second threshold 306 higher than the first threshold 304. For example, the first threshold 304 may be the proof pressure or a value associated with the proof pressure, and the second threshold 306 may be the burst pressure or a value associated with the burst pressure. More than two thresholds may be used.

Data related to the exposure of the pressure transducer 202 to pressure values greater than the one or more threshold is recorded. The data may relate to various parameters associated with the instantaneous pressure exceeding the threshold, such as time of occurrence, duration, frequency, and the like.

The data as recorded may be used to determine whether or not an alert signal should be sent in response to the exposure of the pressure transducer to excessive pressure values. In some embodiments, an alert signal is sent whenever the threshold is exceeded. Alternatively or in combination therewith, an alert signal is sent only when certain predetermined conditions are met. The conditions may be related to the amount by which the threshold was exceeded, the duration of the exceedance of the threshold, the frequency of exceedance of the threshold, or any combination thereof. For example, if the exposure is for a duration that is greater than a predetermined time, such as 1 s, 5 s, 20 s, or any other suitable value, an alert signal may be issued. If the frequency of the exposure is greater than a predetermined value, such as twice or three times over a given time period, an alert signal may be issued. If the threshold is exceeded for more than a predetermined duration, such as 2 s, for a predetermined frequency, such as three times, over a predetermined time period, such as 30 min, then an alert signal may be issued. Any combination of conditions which are indicative of a possible failure or malfunction (such as drift) of the pressure transducer may be used to determine if an alert signal should be sent. Historical data, tests, and/or simulations may be used to set the predetermined conditions, as suitable as a function of the application in which the pressure transducers are used.

In some embodiments, the alert signal may be sent to a cockpit of an aircraft or to another system of the engine and/or aircraft. An alert signal may also be sent to a location remote to the aircraft. The alert signal may be indicative of a need for a maintenance action. For example, the alert signal may cause a visual and/or audio indicator in the cockpit to turn on. The alert signal may cause a text message to scroll across a screen in the cockpit. In some embodiments, the alert signal may cause a maintenance flag associated with the engine to be set.

Figure 4:
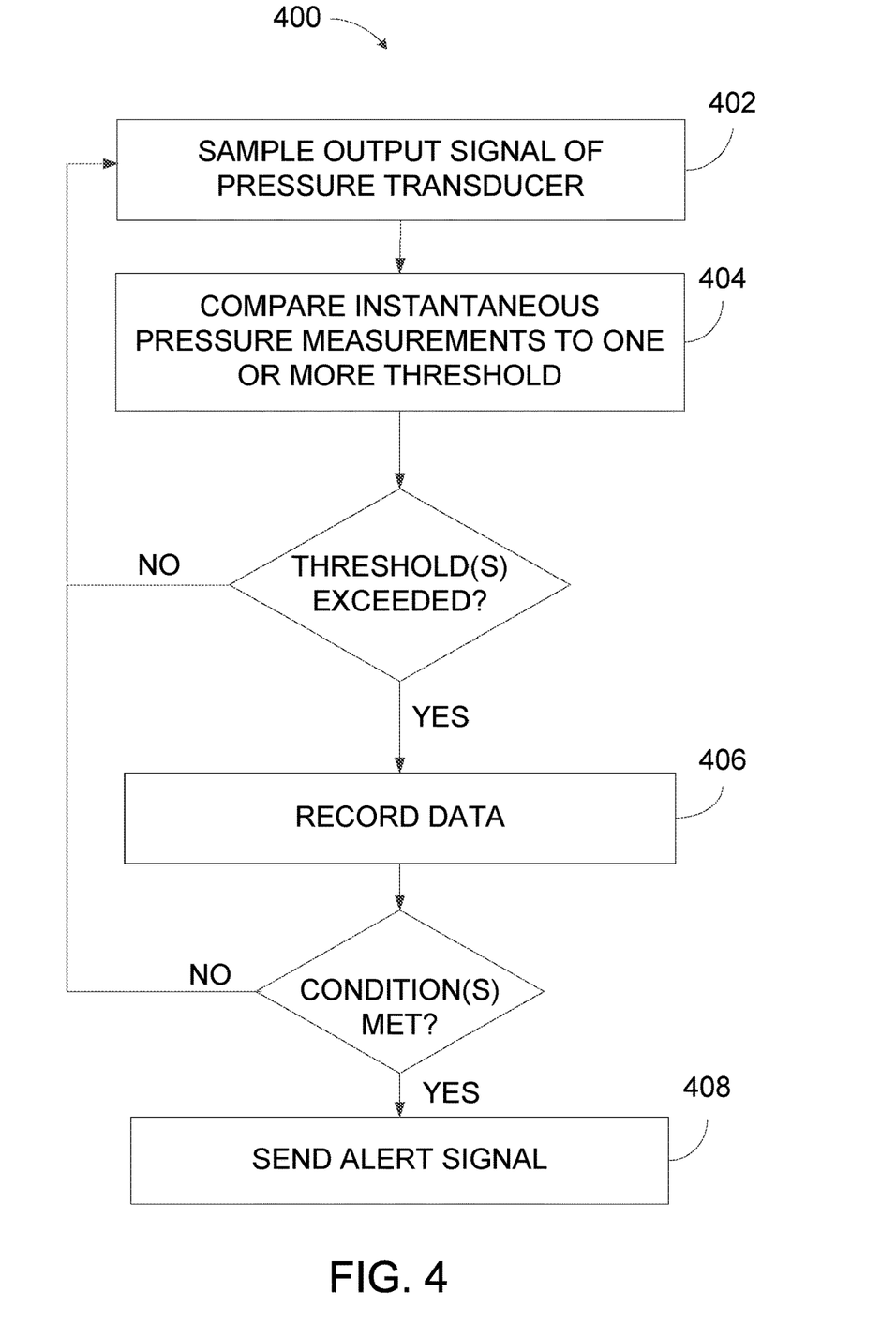
FIG. 4 is a flowchart of a method for monitoring a pressure transducer, in accordance with one or more embodiments.

With reference to FIG. 4, there is illustrated an example of a method 400 for monitoring a pressure transducer, such as pressure transducer 202 associated with the engine 10. At step 402, the output signal of the pressure transducer is sampled. As previously indicated, sampling my occur within a controller 200, which may be a full-authority digital engine controls (FADEC) or other similar device, including electronic engine control (EEC), engine control unit (ECU), electronic propeller control, propeller control unit, and the like. Alternatively, the sampling may occur externally to the controller 200. In some embodiments, sampling occurs pre-filtering of the output signal of the pressure transducer.

At step 404, the instantaneous pressure measurements as sampled from the output signal of the pressure transducer are compared to one or more thresholds. The thresholds are associated with an exposure limit for the pressure transducer, either as the actual rated value or a value related to the rated value. The rated value may be a proof pressure, a burst pressure, or any other type of limit of the pressure transducer.

When the one or more threshold is exceeded, data related to the exceedance is recorded at step 406. The data may be recorded in various formats, such as in a table, an example of which is illustrated in Table 1.

TABLE 1

| PT ID | TIME | DURATION | DELTA |
|---|---|---|---|
| PT_1 | 11:34 am | 2 µs | 5 psi |
| PT_2 | 1:18 pm | 5 µs | 2 psi |
| PT_3 | 4:44 pm | 1 µs | 1 psi |

In the example of Table 1, data is recorded for three different pressure transducers, as compared to one threshold. PT_1 exceeded the threshold ("DELTA") by 5 psi for a duration of 2 µs at 11:34 am. PT_2 exceeded the threshold by 2 psi for a duration of 5 µs at 1:18 pm. PT_3 exceeded the threshold by 1 psi for 1 µs at 4:44 pm. If recording space is limited, data may be collected in a manner to reduce data storage, for example by recording only a duration of exposure and a frequency of the occurrence at that duration. Other embodiments may also apply.

In some embodiments, certain conditions are set to trigger sending of an alert signal, as per step 408. For example, if the conditions relate to duration, the alert signal will be sent when the instantaneous pressure measurements exceed the threshold for the duration set in the conditions. If the conditions relate to frequency, the alert signal will be sent when the instantaneous pressure measurements exceed the threshold for a given pressure transducer a number of times corresponding to the frequency set in the conditions. If the conditions relate to a combination of parameters, the alert signal will be sent when the combination of parameters are met. In some embodiments, step 408 is omitted from the method 400. Recorded data may be used by an engine manufacturer and/or engine operator for various purposes, such as to defend a claim of improper use of the pressure transducer vs a claim of design/manufacturing defect.

Figure 5:
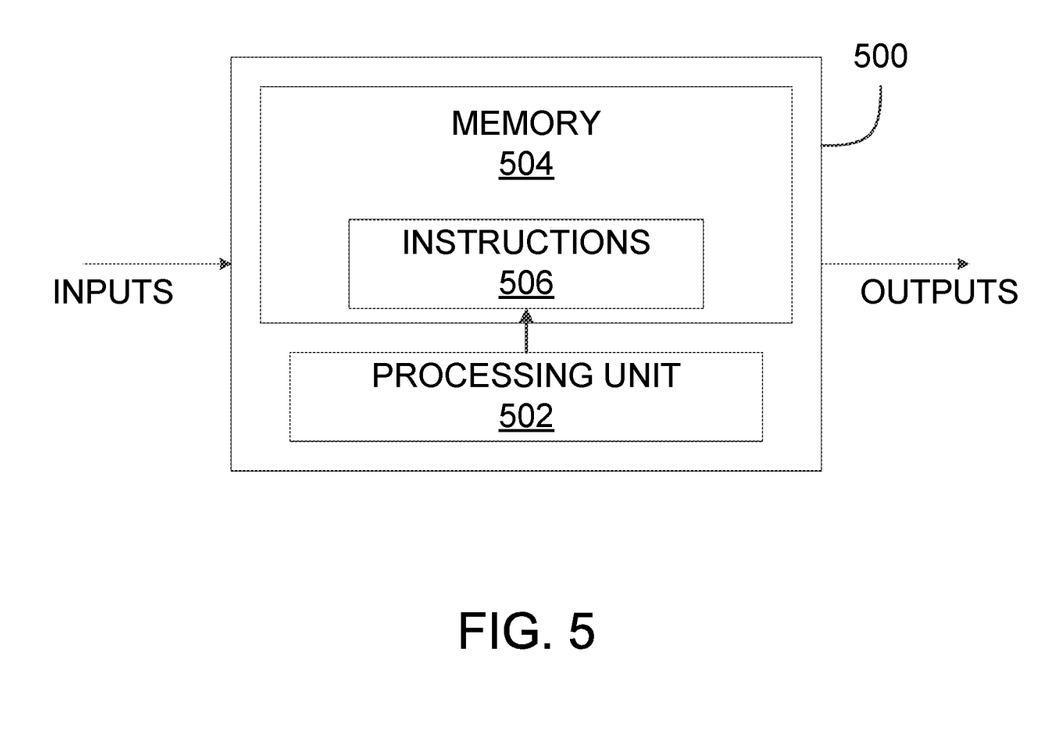
FIG. 5 is a block diagram of a computing device for implementing the controller of FIG. 2, in accordance with one or more embodiments.

With reference to FIG. 5, an example of a computing device 500 is illustrated for performing the method 400. The controller 200, or any other device configured for monitoring a pressure transducer as per the method 400, may be implemented with one or more computing devices 500. The computing device 500 may form part or all of a FADEC, EEC, ECU, electronic propeller control, propeller control unit, and the like. In some embodiments, the computing device 500 is part of a Flight Data Acquisition Storage and Transmission system, such as a FAST™ system configured for performing part or all of the method 400.

The computing device 500 comprises a processing unit 502, which may be the processing unit 206, and a memory 504 which has stored therein computer-executable instructions 506. The processing unit 502 may comprise any suitable devices configured to implement the method 400 such that instructions 506, when executed by the computing device 500 or other programmable apparatus, may cause the functions/acts/steps performed as part of the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for monitoring a pressure transducer described herein may be implemented in a high level procedural or object oriented programming or scripting language, or a combination thereof, to communicate with or assist in the operation of a computer system, for example the computing device 500. Alternatively, the methods and systems for monitoring a pressure transducer may be implemented in assembly or machine language. The language may be a compiled or interpreted language. Program code for implementing the methods and systems for monitoring a pressure transducer may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for monitoring a pressure transducer may also be considered to be implemented by way of a non-transitory computer-readable storage medium having a computer program stored thereon. The computer program may comprise computer-readable instructions which cause a computer, such as the processing unit 502 of the computing device 500, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present disclosure will be apparent to those skilled in the art, in light of a review of this disclosure.

Various aspects of the methods and systems for monitoring a pressure transducer may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. The scope of the following claims should not be limited by the embodiments set forth in the examples, but should be given the broadest reasonable interpretation consistent with the description as a whole.

The invention claimed is:

1. A method for monitoring a pressure transducer, the method comprising:
    sampling an output signal of a pressure transducer exposed to pressure to obtain a plurality of pressure measurements indicative of respective pressure values to which the pressure transducer is exposed;
    comparing the pressure measurements to a first pressure exposure limit associated with the pressure transducer;
    determining an exceedance of the first pressure exposure limit from the pressure measurements; and
    recording data related to the exceedance of the first pressure exposure limit;
    wherein:
        the first pressure exposure limit is associated with a proof pressure for the pressure transducer; and
        the method further comprises:
            comparing the pressure measurements to a second pressure exposure limit associated with a burst pressure for the pressure transducer; and
            recording data related to exposure of the pressure transducer to the second pressure exposure limit.

2. The method of claim 1, wherein recording data related to the exceedance of the first pressure exposure limit comprises recording a time of exposure of the pressure transducer to pressure that exceeds the first pressure exposure limit.

3. The method of claim 1, wherein recording data related to the exceedance of the first pressure exposure limit comprises recording a duration of exposure of the pressure transducer to pressure that exceeds the first pressure exposure limit.

4. The method of claim 1, wherein recording data related to the exceedance of the first pressure exposure limit comprises recording a frequency of exposure of the pressure transducer to pressure that exceeds the first pressure exposure limit.

5. The method of claim 1, wherein sampling the output signal comprises sampling the output signal prior to the output signal being filtered.

6. The method of claim 1, further comprising sending an alert signal when the pressure measurements meet at least one condition associated with the first pressure exposure limit.

7. The method of claim 6, wherein the at least one condition comprises at least one of a duration of exposure, a frequency of exposure, and an amount by which the first pressure exposure limit is exceeded.

8. A system for monitoring a pressure transducer, the system comprising:
    a processing unit; and
    a non-transitory computer readable medium having stored thereon program instructions executable by the processing unit for:
        sampling an output signal of a pressure transducer exposed to pressure to obtain a plurality of pressure measurements as recorded from the pressure transducer;
        comparing the pressure measurements to a first pressure exposure limit associated with the pressure transducer;
        determining an exceedance of the first pressure exposure limit from the pressure measurements; and
        recording data related to the exceedance of the first pressure exposure limit;
    wherein:
        the first pressure exposure limit is associated with a proof pressure for the pressure transducer; and
        the program instructions are further executable for:
            comparing the pressure measurements to a second pressure exposure limit associated with a burst pressure for the pressure transducer; and
            recording data related to exposure of the pressure transducer to the second pressure exposure limit.

9. The system of claim 8, wherein recording data related to the exceedance of the first pressure exposure limit comprises recording a time of exposure of the pressure transducer to pressure that exceeds the first pressure exposure limit.

10. The system of claim 8, wherein recording data related to the exceedance of the first pressure exposure limit comprises recording a duration of exposure of the pressure transducer to pressure that exceeds the first pressure exposure limit.

11. The system of claim 8, wherein recording data related to the exceedance of the first pressure exposure limit comprises recording a frequency of exposure of the pressure transducer to pressure that exceeds the first pressure exposure limit.

12. The system of claim 8, wherein sampling the output signal comprises sampling the output signal prior to the output signal being filtered.

13. The system of claim 8, wherein the program instructions are further executable for sending an alert signal when the pressure measurements meet at least one condition associated with the first pressure exposure limit.

14. The system of claim 13, wherein the at least one condition comprises at least one of a duration of exposure, a frequency of exposure, and an amount by which the first pressure exposure limit is exceeded.

15. A system comprising:
- a gas turbine engine;
- at least one pressure transducer coupled to the gas turbine engine for measuring pressure along a gas path thereof; and
- a controller coupled to the at least one pressure transducer and configured for:
  - sampling an output signal of the at least one pressure transducer exposed to pressure to obtain a plurality of pressure measurements;
  - comparing the pressure measurements to a first pressure exposure limit associated with the at least one pressure transducer;
  - determining an exceedance of the first pressure exposure limit from the pressure measurements; and
  - recording data related to the exceedance of the first pressure exposure limit;

wherein:
- the first pressure exposure limit is associated with a proof pressure for the pressure transducer; and
- the controller is configured for:
  - comparing the pressure measurements to a second pressure exposure limit associated with a burst pressure for the pressure transducer; and
  - recording data related to exposure of the pressure transducer to the second pressure exposure limit.

16. The system of claim 15, wherein sampling the output signal comprises sampling the output signal prior to the output signal being filtered.

\* \* \* \* \*